May 9, 1961  J. ZOMLEFER  2,982,990
APPARATUS FOR DISPERSING PIGMENT IN PLASTIC MATERIAL
Filed Nov. 10, 1958
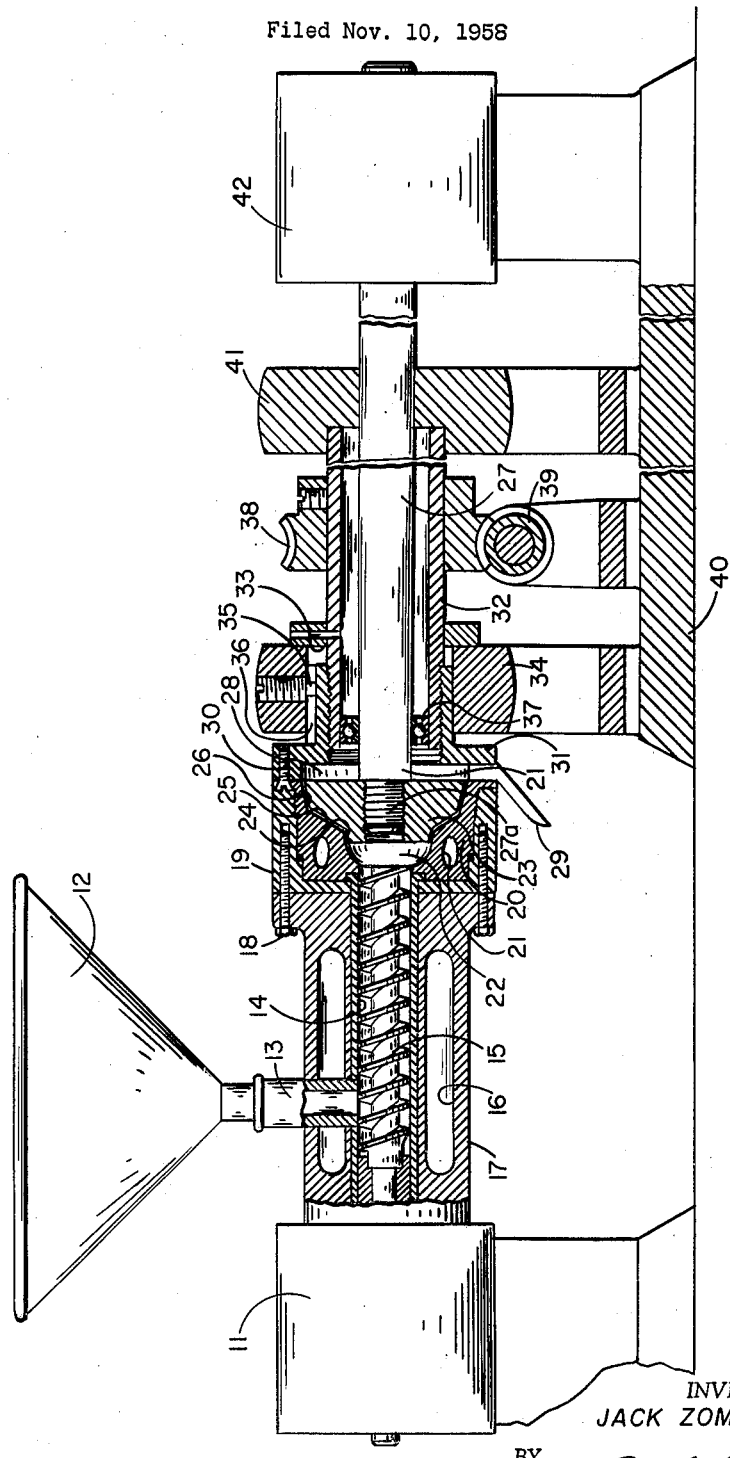
INVENTOR.
JACK ZOMLEFER
BY
ATTORNEY.

United States Patent Office 2,982,990
Patented May 9, 1961

2,982,990
APPARATUS FOR DISPERSING PIGMENT IN PLASTIC MATERIAL
Jack Zomlefer, Leominster, Mass., assignor to Solar Chemical Corporation, Leominster, Mass., a corporation of Massachusetts
Filed Nov. 10, 1958, Ser. No. 773,005
1 Claim. (Cl. 18—2)

This invention relates to an apparatus for dispersing finely divided pigments in plastic material. In particular it relates to an apparatus useful for the dispersion of carbon black in polyethylene.

Prior to this invention the common apparatus for dispersing pigments, fillers, plasticizers, and the like into plastic material has consisted of either a heated two-roll mill or a mechanical mixer, such as a Banbury mixer or Werner-Pfleiderer mixer. While such apparatus has been reasonably satisfactory with many resins and plastics, as, for example, polyvinyl chloride resins, it has been unsatisfactory as regards polyethylene. In particular, no apparatus has been previously described which will uniformly disperse carbon black in polyethylene without the aid of other processing steps.

One object of this invention is to provide an apparatus which can be used to uniformly disperse carbon black in polyethylene without the aid of other processing steps.

Other objects and advantages of this invention will be readily apparent from the specification and claim which follow, and in the appended drawing, which illustrates a vertical longitudinal section of a preferred embodiment of this invention.

My invention comprises generally an extruder having a heated barrel in which a closely spaced feed screw operates, a mixing chamber in which the far end of the screw terminates, and an axially aligned rotor in said mixing chamber. The rotor is adjusted to be rotatable within a portion of the cavity which forms a correspondingly shaped stator. The rotor and stator are characterized as having corresponding multiple angle plane grinding faces of frusto-conical contour. The stator is longitudinally adjustable with respect to its spacing from the rotor. In particular the rotor is characterized as being substantially frusto-conical in side elevation with its outer face in the form of superposed frusto-conical sections which are progressively smaller so that the base of each is the same diameter as the truncated vertex of the preceding section with the faces being contiguous. The stator has a complementary structure to the rotor.

In the embodiment illustrated in the drawing, motor 11 drives the feed screw 15. The feed screw 15 is housed in chamber 14 which forms a central longitudinal cavity within the housing 17. Within the outside portion of housing 17 are chambers 16 which are connectable to either flowing water or steam for the purpose of temperature control. An inlet port 13 is provided from the outside to the chamber 14, and in conjunction with funnel 12 permits entry of ingredients into the chamber.

On the output side of the housing 17 bolts 18 hold it to a hollow housing 19 having interior threading to which stator 20 is attached. Stator 20 contains chamber 21 for temperature control and also a central flaring cavity 22. The feed screw 15 projects beyond chamber 14 (in housing 17) and terminates in central cavity 22. Cavity 22 is shaped substantially frusto-conical and in longitudinal section shows superposed frusto-conical sections 24, 25, and 26 which are progressively larger. The base of each section is the same diameter as the truncated vertex of the base-setting section, with the faces being contiguous.

Spaced within this central cavity 22 is a rotor 23 of complementary design and close clearance. A small clearance is provided between the rotor and stator 20. A larger space is provided between the end of screw 15 and rotor 23. Rotor 23 is mounted by being threaded on the threaded extension 27A of driveshaft 27. Driveshaft 27 is driven by motor 42 and rides on roller bearings 37. Shaft 27 extends through bearing 41 and then through cylindrical tube 32 in which bearings 37 are mounted.

Tubular housing 32 is supported by a threaded connection with tubular neck 31 which in turn is bolted by bolts 30 to housing 19 so as to form an output chamber 28 between the end of tube 32 and rotor 23. Output chamber 28 leads to output spout 29. Adjustment of stator-rotor clearance is obtained by turning tube 32 with respect to neck 31. This is accomplished by turning worm 39, which meshes with worm 38, fixed to tube 32. Tubular neck 31 rests on bearing 34 and is held in place by pin 35 within groove 36. Base 40 supports bearing 41, bearing 34, motor 42 and worm 39 cooperating with worm gear 38.

In using the apparatus of this invention, the ingredients to be dispersed with one another are simply added in mixed granulated form to funnel 12 and the resultant, dispersed powder is recovered from spout 29. The extent of cooling and/or heating depends on the plasticity of the material used, the volume input and the selected speeds of rotation. With thermoplastic resins, such as polyethylene, chambers 16 are heated and chambers 21 cooled. Where the initial mixture is granulated polyethylene and carbon black, the final product is a molding powder whose particles contain a microscopically uniform dispersion of carbon black in the polyethylene, with no phase separation.

I claim:

In combination, an elongated tube equipped with temperature control means, an axially rotatable elongated feed screw spaced within said tube, means for driving said screw, means for adding material into one portion of said tube, a stator having smooth walls and faces adjacent the end of said tube and containing a smooth walled cavity in which said screw terminates, a rotor axially spaced within said stator, a receiving and dispensing chamber behind said rotor, and means for driving said rotor; said rotor being characterized as having smooth circumferential faces at each end and on its intermediate portion; said faces having a decreasing taper toward the front end of the rotor; said stator having complementary shaped and positioned faces to said rotor faces, having means for longitudinal adjustment with respect to said rotor, and having means for temperature control; said screw, cavity, clearance between rotor and stator, and dispensing chamber forming consecutively a continuous path, said rotor and stator being further characterized as having corresponding multiple angle plane grinding faces of frusto-conical contour.

References Cited in the file of this patent
UNITED STATES PATENTS

| 800,073 | Cihalewski | Sept. 19, 1905 |
|---|---|---|
| 1,508,109 | Lovejoy | Sept. 9, 1924 |
| 1,780,067 | Cox | Oct. 28, 1930 |
| 1,881,917 | Parkhurst | Oct. 11, 1932 |
| 2,763,896 | Vogt | Sept. 25, 1956 |
| 2,780,834 | Bernhardt | Feb. 12, 1957 |
| 2,894,280 | Juve | July 14, 1959 |

FOREIGN PATENTS

| 1,148,154 | France | June 17, 1957 |